United States Patent
Horn

(10) Patent No.: US 11,599,305 B2
(45) Date of Patent: Mar. 7, 2023

(54) DATA STORAGE DEVICE USING PREDEFINED DATA SEGMENTS FOR LOGICAL ADDRESS MAPPING

(71) Applicant: Western Digital Technologies, Inc., San Jose, CA (US)

(72) Inventor: Robert L. Horn, Yorba Linda, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/317,018

(22) Filed: May 11, 2021

(65) Prior Publication Data

US 2022/0365715 A1    Nov. 17, 2022

(51) Int. Cl.
*G06F 3/06* (2006.01)

(52) U.S. Cl.
CPC .......... *G06F 3/0659* (2013.01); *G06F 3/064* (2013.01); *G06F 3/0611* (2013.01); *G06F 3/0676* (2013.01)

(58) Field of Classification Search
CPC ...... G06F 3/0659; G06F 3/0611; G06F 3/064; G06F 3/0676
See application file for complete search history.

(56) References Cited

U.S. PATENT DOCUMENTS

| | | | |
|---|---|---|---|
| 6,307,700 B1 * | 10/2001 | Takayama | G11B 27/11 |
| 8,019,925 B1 | 9/2011 | Vogan et al. | |
| 8,443,167 B1 | 5/2013 | Fallone et al. | |
| 8,526,136 B2 | 9/2013 | Katagiri et al. | |
| 8,654,476 B2 | 2/2014 | Katagiri et al. | |
| 8,867,160 B2 | 10/2014 | Katagiri et al. | |
| 2003/0023778 A1 * | 1/2003 | Berning | G06F 3/0601 710/5 |
| 2011/0283052 A1 * | 11/2011 | Mukaida | G06F 12/0246 711/E12.001 |
| 2022/0035563 A1 * | 2/2022 | Miyamura | G06F 3/064 |

* cited by examiner

*Primary Examiner* — Kalpit Parikh
(74) *Attorney, Agent, or Firm* — Patterson + Sheridan, LLP; Steven H. VerSteeg

(57) ABSTRACT

A data storage device configured to access a magnetic tape comprising a plurality of data tracks is disclosed, wherein the data storage device comprises at least one head configured to access the magnetic tape. A mapping table is generated having a predetermined number of segment entries per data track, wherein each segment entry corresponds to a data segment of the data track, each segment entry comprises a first logical address corresponding to a first logical data block stored in the corresponding data segment, and at least one of the data segments stores multiple logical data blocks. A target segment entry in the mapping table corresponding to a logical address of a read command is located, and the head is positioned at a beginning of a target data segment of a target data track corresponding to the target segment entry in order to execute the read command.

20 Claims, 4 Drawing Sheets

MAPPING TABLE

| | 1ST LA |
|---|---|
| SEG 1 | X |
| SEG 2 | X |
| SEG 3 | X |
| SEG 4 | X |
| SEG 5 | X |
| SEG 6 | X |
| SEG 7 | X |
| SEG 8 | X |
| ... | |
| SEG 47 | X |
| SEG 48 | X |

| TRACK # | DIRECTION |
|---|---|
| 1 | RIGHT |
| 1 | RIGHT |
| 1 | RIGHT |
| 1 | RIGHT |
| 1 | RIGHT |
| 1 | RIGHT |
| 8 | LEFT |
| 8 | LEFT |
| ... | |
| 5 | LEFT |
| 5 | LEFT |

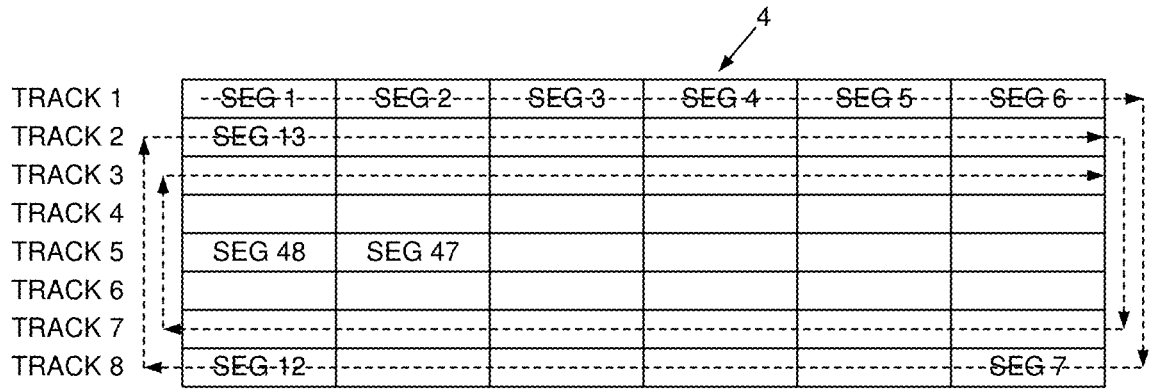
FIG. 2A
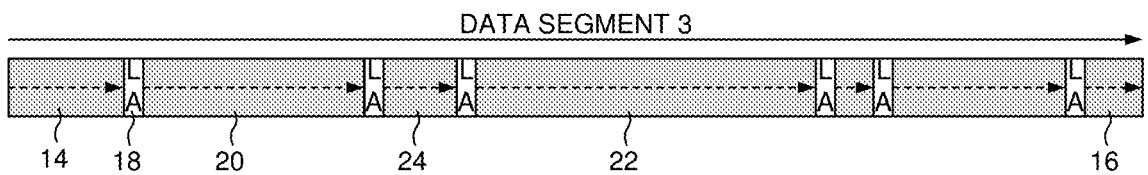
FIG. 2B
| | MAPPING TABLE | | | |
|---|---|---|---|---|
| | $1^{ST}$ LA | | TRACK # | DIRECTION |
| SEG 1 | X | | 1 | RIGHT |
| SEG 2 | X | | 1 | RIGHT |
| SEG 3 | X | | 1 | RIGHT |
| SEG 4 | X | | 1 | RIGHT |
| SEG 5 | X | | 1 | RIGHT |
| SEG 6 | X | | 1 | RIGHT |
| SEG 7 | X | | 8 | LEFT |
| SEG 8 | X | | 8 | LEFT |
| ⋮ | | | | |
| SEG 47 | X | | 5 | LEFT |
| SEG 48 | X | | 5 | LEFT |
FIG. 2C

DATA STORAGE DEVICE USING PREDEFINED DATA SEGMENTS FOR LOGICAL ADDRESS MAPPING

BACKGROUND

Conventional tape drive storage systems comprise a magnetic tape wound around a dual reel (reel-to-reel cartridge) or a single reel (endless tape cartridge), wherein the reel(s) are rotated in order to move the magnetic tape over one or more transducer heads during write/read operations. The format of the magnetic tape may be single track or multiple tracks that are defined linearly, diagonally, or arcuate with respect to the longitudinal dimension along the length of the tape. With a linear track format, the heads may remain stationary relative to the longitudinal dimension of the tape, but may be actuated in a lateral dimension across the width of the tape as the tape moves past the heads. With a diagonal or arcuate track format, the heads may be mounted on a rotating drum such that during access operations both the heads and tape are moved relative to one another (typically in opposite directions along the longitudinal dimension of the tape).

BRIEF DESCRIPTION OF THE DRAWINGS

FIG. 2A shows an embodiment wherein the magnetic tape comprises eight data tracks each having six data segments for a total of forty-eight data segments.

FIG. 2B shows an example data segment storing partial and full logical data blocks, including a logical address stored in a header of each logical data block.

FIG. 2C shows a mapping table corresponding to the embodiment of 2A, wherein each segment entry comprises a first logical address corresponding to a first logical data block stored in the corresponding data segment.

DETAILED DESCRIPTION

Figure 1A:
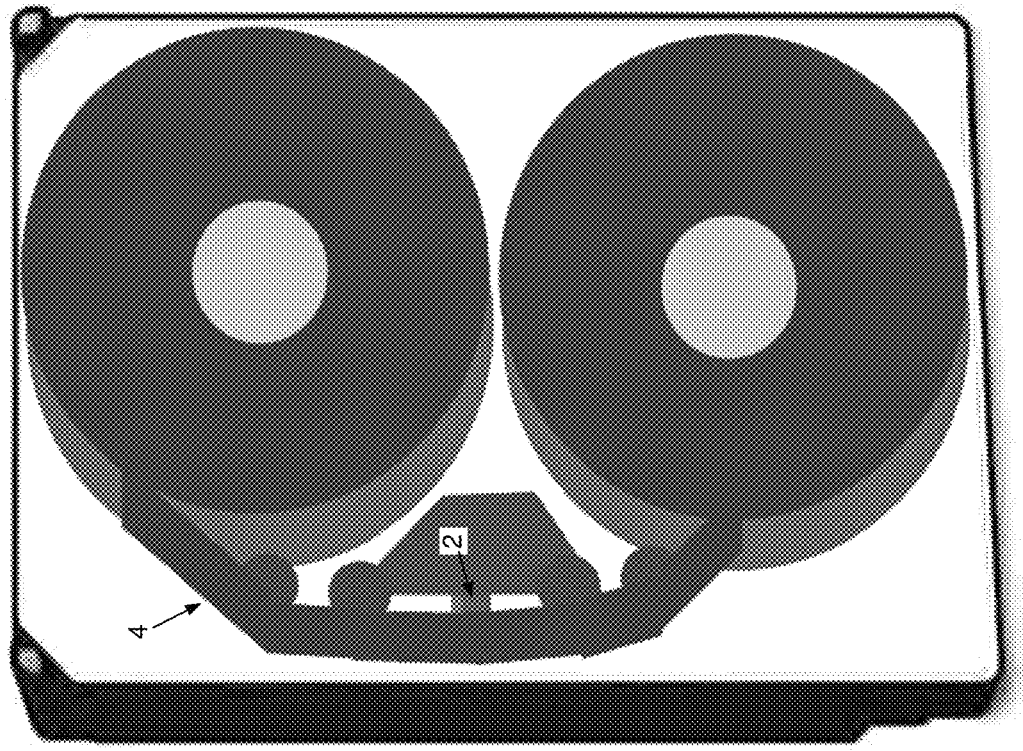
FIG. 1A shows a data storage device according to an embodiment comprising at least one head configured to access a magnetic tape.
Figure 1B:
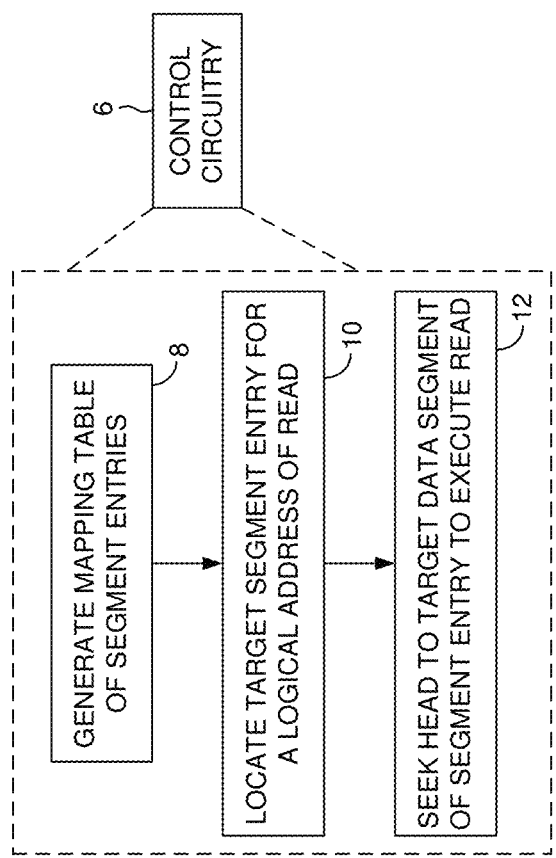
FIG. 1B is a flow diagram according to an embodiment wherein a mapping table is generated having a predetermined number of segment entries per data track, wherein each segment entry corresponds to a data segment of the data track and each segment entry comprises a first logical address corresponding to a first logical data block stored in the corresponding data segment.

FIGS. 1A-1B show a data storage device according to an embodiment comprising at least one head 2 configured to access a magnetic tape 4 and control circuitry 6 configured to generate a mapping table (block 8) having a predetermined number of segment entries per data track, wherein each segment entry corresponds to a data segment of the data track. Each segment entry comprises a first logical address corresponding to a first logical data block stored in the corresponding data segment, and at least one of the data segments stores multiple logical data blocks. A target segment entry in the mapping table corresponding to a logical address of a read command is located (block 10), and the control circuitry seeks the head to a beginning of a target data segment of a target data track corresponding to the target segment entry in order to execute the read command (block 12).

Figure 1C:
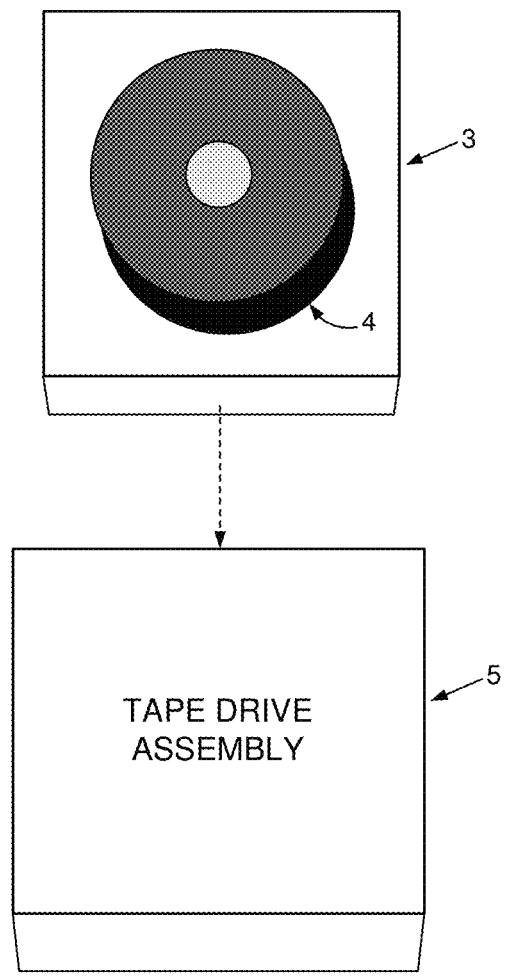
FIG. 1C shows an embodiment wherein the data storage device comprises a tape drive assembly configured to access a magnetic tape housed in a cartridge assembly.

In the embodiment of FIG. 1A, the data storage device comprises an embedded magnetic tape 4 installed into a tape drive assembly which, in one embodiment, may be the same form factor as a conventional disk drive. In another embodiment shown in FIG. 1C, the magnetic tape 4 may be housed in a cartridge assembly 3 that is inserted into (and ejected from) a tape drive assembly 5 similar to a conventional tape drive manufactured under the Linear Tape-Open (LTO) standard. In one embodiment, the tape drive assembly 5 comprises the head 2 configured to access the magnetic tape 4, and the control circuitry configured to execute the flow diagram of FIG. 1B. In the embodiment of FIG. 1C, the magnetic tape 4 is wound around a single reel which may also be employed in the embodiment of FIG. 1A.

FIG. 2A shows an embodiment wherein the magnetic tape 4 comprises a band of eight data tracks, wherein each data track is divided into six equal length data segments. In this embodiment, the data tracks are written from the outer tracks toward the inner tracks of the band as indicated by the sequence 1-8 of the data tracks and the sequence 1-48 of the data segments. In one embodiment, logical data blocks of varying size are sequentially written to the data segments, for example, as logical data blocks of varying size are received from a host. FIG. 2B shows an example of this embodiment wherein data segment 3 of FIG. 2A is written with multiple logical data blocks, including a residual 14 of a logical data block written at the end of data segment 2, and a beginning 16 of a logical data block written at the end of data segment 3. Each logical data block that begins in data segment 3 comprises a header including a logical address (LA) identifying the logical data block (e.g., LA 18 written in a header for logical data block 20). When writing the logical data blocks sequentially to the magnetic tape 4, the sequential order of the LAs in the data segments enables compaction in the segment mapping table. FIG. 2C shows an example mapping table comprising a plurality of segment entries each corresponding to a data segment of FIG. 2A (i.e., there are 48 segment entries in this example). Each segment entry comprises a first logical address corresponding to a first logical data block stored in the corresponding data segment. For example, the segment entry corresponding to the data segment 3 of FIG. 2B comprises the LA 18 of logical data block 20 (represented in FIG. 2C by the generic value "X" in the first logical address (LA) column, since logical data block 20 is the first logical data block that begins in the segment). When a read command is received from the host to read a logical data block, the mapping table may be searched based on the logical address of the read command (e.g., using a binary search) in order to locate the data segment storing the logical data block. The control circuitry 6 then seeks the head to the beginning of the target data segment and begins reading the target data segment (including the headers of the logical data blocks) until the target logical data block is located. Referring again to the example of FIG. 2B, when a read command is received to read logical data block 22, the control circuitry 6 seeks the head to the beginning of data segment 3 of FIG. 2A and begins reading the data segment. While reading the data segment, the control circuitry 6 skips over logical data block 20 and logical data block 24, and when the head reaches logical data block 22, the logical data block is read and transferred to the host. In one embodiment, using a mapping table of segment entries that is searched based on a logical block address (e.g., binary search, B-tree, skip-list, interpolation based on average objects per segment, etc.) as described above significantly reduces the size of the mapping table as compared to a conventional mapping technique that store mapping information for each logical data block.

Figure 3:
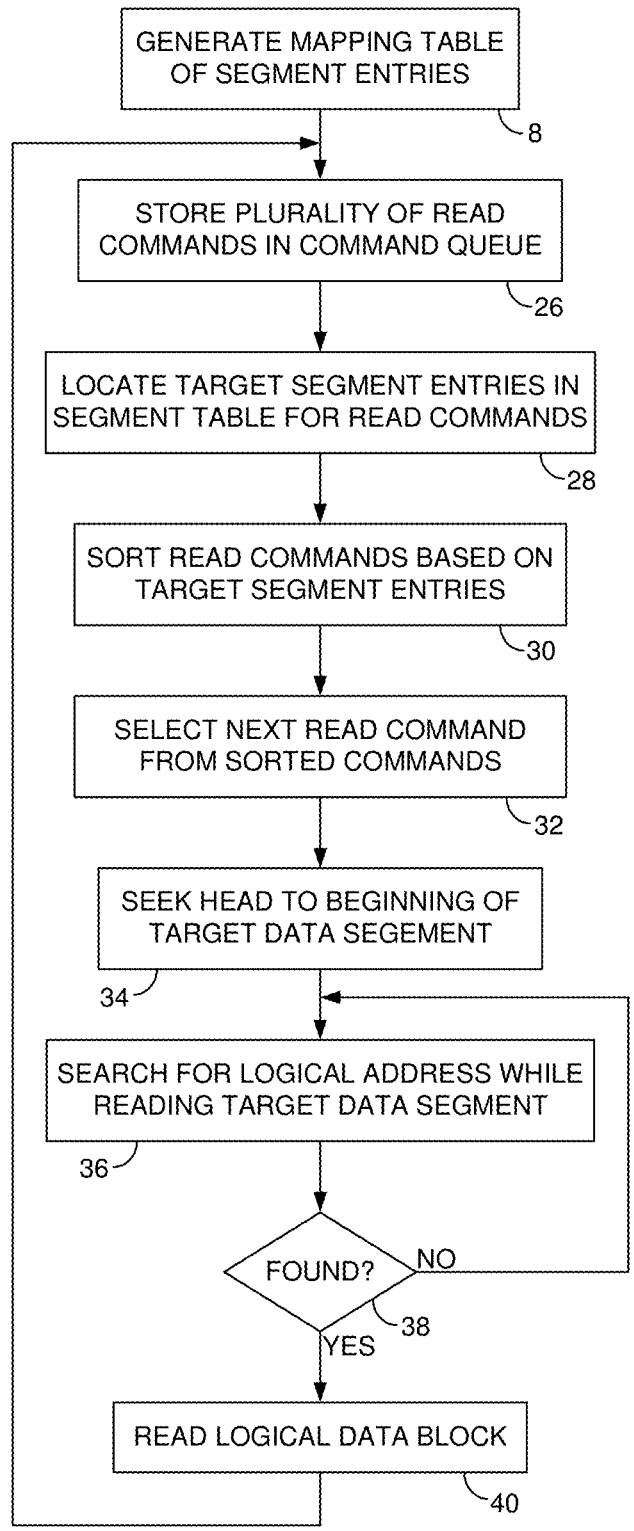
FIG. 3 is a flow diagram according to an embodiment wherein a plurality of queued read commands are sorted into an execution order based on the corresponding target segment entries.

In one embodiment, the mapping table such as shown in FIG. 2C may be used to sort a plurality of read commands stored in a command queue into a desired execution order. For example, the read commands may be sorted into an execution order that minimizes an access latency associated with executing the read commands. FIG. 3 is a flow diagram according to this embodiment wherein a plurality of read commands (e.g., received from a host) are stored in a command queue (block 26). A target segment entry for each read command is located by searching the mapping table based on the logical address of each read command (block 28), and the read commands are sorted based on the target segment entries. Referring again to the example of FIG. 2A, an access latency may be computed for each pending read command based on the current location of the head 2 relative to the data tracks, and the target location of the head corresponding to each target segment entry. That is, there is an access latency in seeking the head to a target data track and waiting for the tape to stream past the head until reaching the target data segment. In one embodiment, the control circuitry 6 may "rewind" the tape in order to position the head at the beginning of a target data segment that has already "past" the current location of the head. When computing the access latency for each target segment entry, in one embodiment the sorting algorithm determines the target data track of each segment entry as well as the streaming direction of the magnetic tape when each data track was written such as shown in the example of FIG. 2C. In one embodiment, the control circuitry 6 may compute "on the fly" the target data track as well as the streaming direction of the magnetic tape based on the known number of data segments per data track as well as the streaming direction of each data track when written such as shown in FIG. 2A.

Referring again to the flow diagram of FIG. 3, after sorting the pending read commands the next read command is selected based on the sorted execution order (block 32). The control circuitry 6 seeks the head to the beginning of the corresponding target data segment, which may involve seeking the head to a different data track and streaming the magnetic tape until the head reaches the beginning of the target data segment (block 34). The control circuitry 6 then reads the target data segment while searching for the logical address for the logical data block of the read command (block 36). When the logical address for the logical data block is found (block 38), the control circuitry reads the logical data block and transfers the data to the host (block 40). The flow diagram is then repeated from block 26, wherein new read commands may be stored in the command queue and considered when sorting the pending read commands into the desired execution order.

The data tracks such as shown in the example of FIG. 2A may comprise any suitable number of data segments, wherein in one embodiment the number of data segments per data track impacts the size of the mapping table as well as the efficiency of the sorting algorithm to optimize a desired performance metric, such as minimizing the access latency when executing a plurality of read commands. Defining fewer, longer data segments per data track reduces the size of the mapping table but may also decrease the efficiency of the sorting algorithm by decreasing the resolution of the streaming latency. In addition, the efficiency of the sorting algorithm and corresponding impact of the streaming latency may depend on the queue depth of the command queue. In one embodiment, the queue depth and number of data segments per data track may be configured by the control circuitry 6, for example, in response to a configuration command received from the host. In another embodiment, the control circuitry 6 may configure the queue depth and number of data segments per data track after detecting the host environment based on an access pattern of the host. In yet another embodiment, the control circuitry 6 may adapt the queue depth and/or the number of data segments per data track (i.e., adapt the size of the mapping table) over time in order to achieve any suitable performance metric, such as to optimize an overall throughput of the tape drive by optimizing the sorting algorithm as well as optimize efficient use of volatile and non-volatile semiconductor memory.

The embodiment of FIG. 2A shows a band of data tracks accessed by a single head based on a particular access sequence. In other embodiments the tape drive may comprise a head bar having an array of write/read elements configured to concurrently write/read a plurality of corresponding data tracks. That is in an embodiment employing a head bar having an array of heads, each data track shown in FIG. 2A may represent multiple physical data tracks being written/read concurrently. In addition, the data segments of the data tracks may be written according to any suitable access sequence other than the example sequence shown in FIG. 2A.

In one embodiment, the control circuitry 6 may format the magnetic tape 4 into a number of partitions, wherein a separate mapping table may be generated for each partition. In one embodiment, a segment mapping table as described above may be generated for one or more partitions, whereas a conventional mapping table may be generated for one or more other partitions in order to improve the performance of the command sorting algorithm at the cost of a larger mapping table.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In addition, any suitable electronic device, such as computing devices, data server devices, media content storage devices, etc. may comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device configured to access a magnetic tape comprising a plurality of data tracks, the data storage device comprising:
   at least one head configured to access the magnetic tape; and
   control circuitry configured to:
      generate a mapping table having a predetermined number of segment entries per data track, wherein:
         each segment entry corresponds to a data segment of a plurality of data segments of the data track, the data segment storing one or more logical data blocks
         each segment entry has a single logical address corresponding to a first logical data block of the one or more logical data blocks stored in the corresponding data segment,
         the first logical data block is a first block in a sequential order in which the one or more logical data blocks were written for the corresponding data segment,
         the segment entries and the corresponding single logical addresses are arranged in the mapping table in a sequential order in which the corresponding data segments were written, and
         at least one of the data segments stores multiple logical data blocks
      locate a target segment entry in the mapping table corresponding to a logical address of a read command, and
      seek the head to a beginning of a target data segment of a target data track corresponding to the target segment entry in order to execute the read command.

2. The data storage device as recited in claim 1, wherein a plurality of logical data blocks are stored in the target data segment of the target data track.

3. The data storage device as recited in claim 2, wherein the control circuitry is further configured to read from the beginning of the target data segment in order to search for a logical data block corresponding to the logical address in the read command.

4. The data storage device as recited in claim 1, wherein the control circuitry is further configured to execute a binary search of the mapping table to locate the target segment entry.

5. The data storage device as recited in claim 1, wherein the control circuitry is further configured to:
   store a plurality of read commands in a command queue;
   locate a target segment entry in the mapping table corresponding to a logical address of each read command; and
   sort the read commands into an execution order based on the target segment entries.

6. The data storage device as recited in claim 5, wherein the control circuitry is further configured to sort the read commands into an execution order that minimizes an access latency, and the sorting comprises:
   determining a corresponding data track for each segment entry; and
   determining a streaming direction of the magnetic tape for each segment entry.

7. A data storage device configured to access a magnetic tape comprising a plurality of data tracks, the data storage device comprising:
   at least one head configured to access the magnetic tape; and
   control circuitry configured to:
      define a predetermined number of data segments per data track,
      receive a read command comprising a logical address corresponding to a logical data block stored in a target data segment of a target data track,
      locate a target segment entry in a mapping table corresponding to the logical address of the read command, the mapping table having a predetermined number of segment entries per data track, wherein:
         each segment entry corresponds to a data segment of a plurality of data segments of the data track, the data segment storing one or more logical data blocks, and
         each segment entry has a single logical address corresponding to a first logical data block of the one or more logical data blocks stored in the corresponding data segment,
      seek the head to a beginning of the target data segment of the target data track, and
      read from the beginning of the target data segment in order to search for the logical data block corresponding to the logical address in the read command.

8. The data storage device as recited in claim 7, wherein the control circuitry is further configured to:
   generate the mapping table, wherein:

the first logical data block is a first block in a sequential order in which the one or more logical data blocks were written for the corresponding data segment, the segment entries and the corresponding single logical addresses are arranged in the mapping table in a sequential order in which the corresponding data segments were written, and at least one of the data segments stores multiple logical data blocks.

9. The data storage device as recited in claim 7, wherein the control circuitry is further configured to execute a binary search of the mapping table to locate the target segment entry.

10. The data storage device as recited in claim 7, wherein a plurality of logical data blocks are stored in the target data segment of the target data track.

11. The data storage device as recited in claim 10, wherein the control circuitry is further configured to skip at least one other logical data block while searching for a logical data block corresponding to the logical address in the read command.

12. The data storage device as recited in claim 8, wherein the control circuitry is further configured to:

store a plurality of read commands in a command queue;

locate the target segment entry in the mapping table corresponding to the logical address of each read command; and sort the read commands into an execution order based on the target segment entries.

13. The data storage device as recited in claim 12, wherein the control circuitry is further configured to sort the read commands into an execution order that minimizes an access latency, and the sorting comprises:

determining a corresponding data track for each segment entry; and determining a streaming direction of the magnetic tape for each segment entry.

14. A data storage device configured to access a magnetic tape comprising a plurality of data tracks, the data storage device comprising:

at least one head configured to access the magnetic tape;

a means for defining a predetermined number of data segments per data track;

a means for receiving a read command comprising a logical address corresponding to a logical data block stored in a target data segment of a target data track;

a means for locating a target segment entry in a mapping table corresponding to the logical address of the read command, the mapping table having a predetermined number of segment entries per data track, wherein:

each segment entry corresponds to a data segment of a plurality of data segments of the data track, the data segment storing one or more logical data blocks, and each segment entry has a single logical address corresponding to a first logical data block of the one or more logical data blocks stored in the corresponding data segment, a means for seeking the head to a beginning of the target data segment of the target data track; and a means for reading from the beginning of the target data segment in order to search for the logical data block corresponding to the logical address in the read command.

15. The data storage device as recited in claim 14, further comprising:

a means for generating the mapping table, wherein:

the first logical data block is a first block in a sequential order in which the one or more logical data blocks were written for the corresponding data segment, the segment entries and the corresponding single logical addresses are arranged in the mapping table in a sequential order in which the corresponding data segments were written, and at least one of the data segments stores multiple logical data blocks.

16. The data storage device as recited in claim 14, wherein the means for locating comprises a binary search of the mapping table to locate the target segment entry.

17. The data storage device as recited in claim 14, wherein a plurality of logical data blocks are stored in the target data segment of the target data track.

18. The data storage device as recited in claim 17, further comprising a means for skipping over at least one other logical data block while searching for a logical data block corresponding to the logical address in the read command.

19. The data storage device as recited in claim 15, further comprising:

a means for storing a plurality of read commands in a command queue;

a means for locating the target segment entry in the mapping table corresponding to the logical address of each read command; and a means for sorting the read commands into an execution order based on the target segment entries.

20. The data storage device as recited in claim 19, wherein the means for sorting minimizes an access latency, and the sorting comprises:

determining a corresponding data track for each segment entry; and determining a streaming direction of the magnetic tape for each segment entry.

\* \* \* \* \*